United States Patent
Shimizu

(10) Patent No.: US 11,086,690 B2
(45) Date of Patent: Aug. 10, 2021

(54) SEMICONDUCTOR DEVICE AND PROCESSOR CONTROL METHOD

(71) Applicant: RENESAS ELECTRONICS CORPORATION, Tokyo (JP)

(72) Inventor: Masayuki Shimizu, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 196 days.

(21) Appl. No.: 16/378,131

(22) Filed: Apr. 8, 2019

(65) Prior Publication Data

US 2019/0332445 A1    Oct. 31, 2019

(30) Foreign Application Priority Data

Apr. 27, 2018 (JP) .............................. JP2018-086891

(51) Int. Cl.
| | |
|---|---|
| *G06F 9/52* | (2006.01) |
| *G06F 1/08* | (2006.01) |
| *G06F 1/3203* | (2019.01) |
| *G06F 9/48* | (2006.01) |

(52) U.S. Cl.
CPC .................. *G06F 9/52* (2013.01); *G06F 1/08* (2013.01); *G06F 1/3203* (2013.01); *G06F 9/4818* (2013.01)

(58) Field of Classification Search
CPC ..... G06F 9/52; G06F 1/08; G06F 1/10; G06F 1/14; G06F 1/3203; G06F 1/324; G06F 1/329
See application file for complete search history.

(56) References Cited

U.S. PATENT DOCUMENTS

| | | | |
|---|---|---|---|
| 8,341,641 B2 | 12/2012 | Maruyama | |
| 2003/0115239 A1* | 6/2003 | Togawa ................ | G06F 9/4887 718/102 |
| 2007/0074216 A1* | 3/2007 | Adachi .................. | G06F 1/329 718/102 |
| 2012/0233488 A1* | 9/2012 | Burchard ............... | G06F 1/324 713/500 |
| 2014/0006819 A1* | 1/2014 | Min ....................... | G06F 1/324 713/320 |

(Continued)

FOREIGN PATENT DOCUMENTS

| | | |
|---|---|---|
| GB | 2 443 307 A | 4/2008 |
| JP | 2008-107944 A | 5/2008 |
| WO | 2009/022371 A1 | 2/2009 |

*Primary Examiner* — Jaweed A Abbaszadeh
*Assistant Examiner* — Hyun Soo Kim
(74) *Attorney, Agent, or Firm* — McDermott Will & Emery LLP

(57) ABSTRACT

A semiconductor device capable of reducing power consumption is provided. A semiconductor device having a processor executing a plurality of tasks while switching the tasks in synchronization with a supplied operational clock signal includes: a processor-use-rate measuring unit configured to measure a use rate of the processor during a first term; and a frequency-dividing-value selecting circuit and a frequency dividing circuit configured to change a frequency of the operational clock signal supplied to the processor during a second term later than the first term on the basis of the use rate measured by the processor-use-rate measuring unit.

4 Claims, 7 Drawing Sheets

(56) References Cited

U.S. PATENT DOCUMENTS

2014/0333361 A1* 11/2014 Chau .................... H03K 3/012
327/175
2015/0074435 A1* 3/2015 Jane .................... G06F 1/3206
713/322
2015/0280901 A1* 10/2015 Hafuka ................. H03L 7/081
375/355

* cited by examiner

SEMICONDUCTOR DEVICE AND PROCESSOR CONTROL METHOD

CROSS-REFERENCE TO RELATED APPLICATION

The present application claims priority from Japanese Patent Application No. 2018-86891 filed on Apr. 27, 2018, the content of which is hereby incorporated by reference into this application.

TECHNICAL FIELD OF THE INVENTION

The present invention relates to a semiconductor device having a processor and to a processor control method. For example, the present invention relates to a semiconductor device having a processor executing a plurality of tasks while switching the tasks and to a processor control method.

BACKGROUND OF THE INVENTION

In order to allow a processor to execute a plurality of tasks while switching the tasks, a multitask operating system (hereinafter, referred to as "OS") is operated on the processor, and the plurality of tasks are operated on the multitask OS. The tasks include a task required to be executed at a previously-determined certain cycle, that is, a task required to have a real-time performance (hereinafter, referred to as "real-time task"). As an OS allowed to handle such a real-time task, a real-time OS is present. The real-time OS is implemented on, for example, a semiconductor device configuring an industrial network apparatus or others, and a processor in the semiconductor device executes the real-time OS.

A data processor on which the real-time OS is mounted is described in, for example, Japanese Patent Application Laid-open Publication No. 2008-107944 (Patent Document 1). A technique that implements the real-time OS by using hardware is described in, for example, International Patent Publication No. WO/2009/022371 (Patent Document 2).

SUMMARY OF THE INVENTION

Generally, the industrial network apparatus is required to have a safety and the real-time performance. In order to secure the safety and the real-time performance, a processor in the industrial network apparatus tends to be operated by an operational clock signal with a higher frequency. Therefore, such a problem as increase in a power consumption of the processor is caused. For example, a lot of industrial network apparatuses are placed in a factory, and such a problem as increase in an entire power consumption of the factory is also caused by the increase in the power consumptions of the processors of the industrial network apparatuses.

The present inventor has studied a processing load state of a network communication semiconductor device used as the industrial network apparatus on which the real-time OS has been implemented. In the study, the present inventor has found out that time for an idle task is relatively long, the idle task being executed when a significant task to be executed (that is a task configuring an application program) is absent. The idle task is a task having the lowest task priority, such as a task executing a null loop processing.

Also when the processor executes the idle task, it operates in synchronization with an operational clock signal having the same frequency as a frequency caused when it executes a higher-priority task. That is, also when the processor executes the idle task, it consumes the same power as a power consumed when it executes the higher-priority task.

The Patent Document 1 describes a data processor having a task demanded performance table that manages demanded performances of individual tasks. In this Patent Document 1, the frequency of the operational clock signal for operating the processor is determined depending on the demanded performance that has been set in the task demanded performance table. In order to allow the data processor described in the Patent Document 1 to process the real-time task, it is required to set a demanded performance having a sufficient margin to the task demanded performance table for securing the real-time performance. Therefore, it cannot be said that the entire processing of the real-time OS is optimized, and there is a concern that the power consumption of the data processor cannot be reduced down to an expected value. On the other hand, when a demanded performance not having the sufficient margin is set, there is a concern that the real-time task to be executed at a certain cycle cannot be entirely processed to lose the real-time performance.

Other object and novel characteristics will be apparent from the description of the present specification and the accompanying drawings.

A semiconductor device according to one embodiment will be described as follows.

That is, the semiconductor device has a processor executing a plurality of tasks while switching the tasks in synchronization with an operational clock signal. The semiconductor device has a use-rate measuring unit configured to measure a use rate of the processor during a first term and a frequency changing unit configured to change a frequency of the operational clock signal supplied to the processor during a second term later than the first term in light of time on the basis of the use rate measured by the use-rate measuring unit.

According to one embodiment, a semiconductor device capable of reducing a power consumption can be provided. On the basis of the use rate during the first term, the frequency of the operational clock signal supplied to the processor during the second term is changed. In this manner, the power consumption of the semiconductor device during the second term can be reduced.

BRIEF DESCRIPTIONS OF THE DRAWINGS

DESCRIPTIONS OF THE PREFERRED EMBODIMENTS

Figure 1:
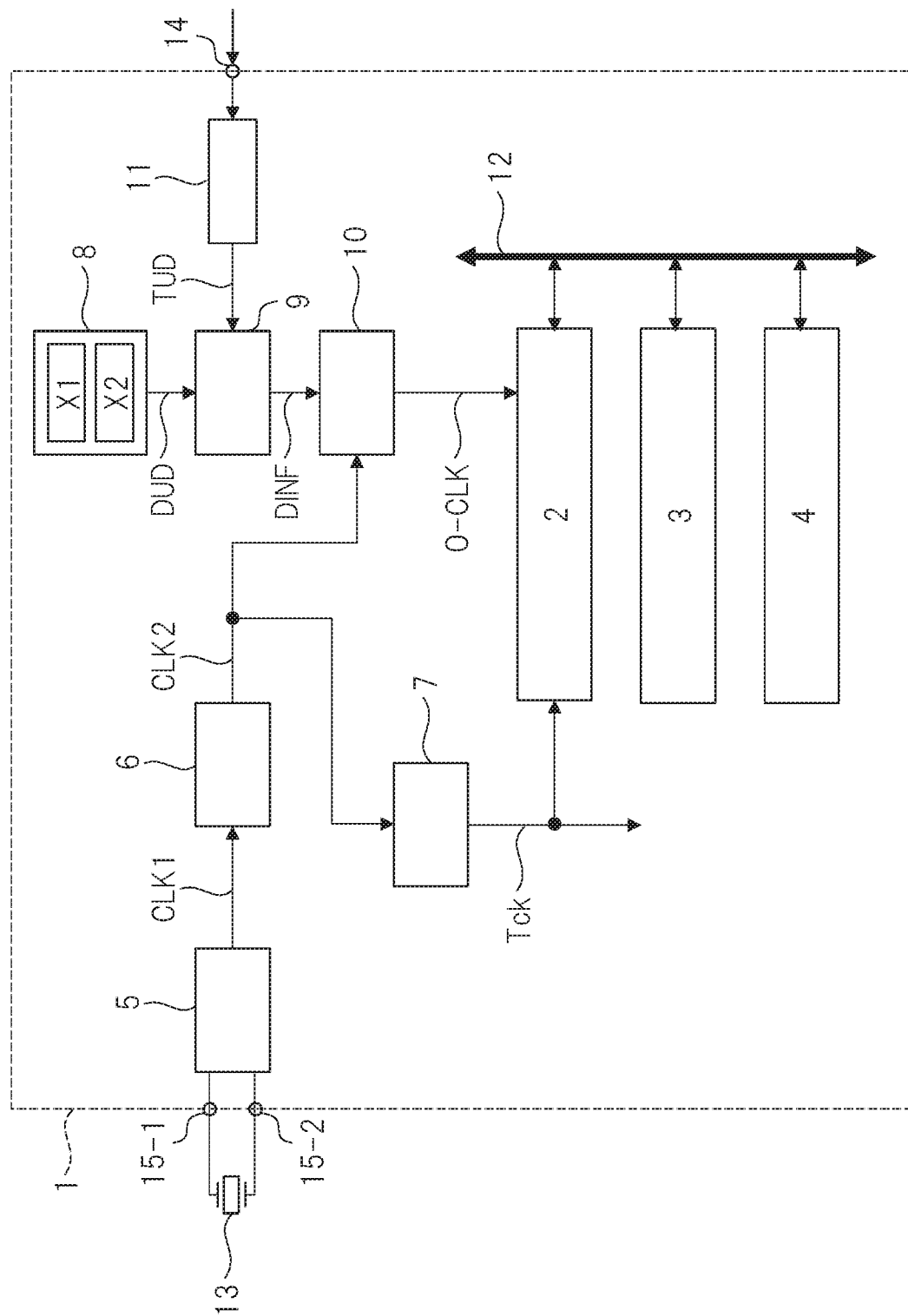
FIG. 1 is a block diagram showing a configuration of a semiconductor device according to a first embodiment.

Hereinafter, each embodiment of the present invention will be described with reference to the drawings. Note that disclosure shows only one example, and appropriate modification with keeping the concept of the present invention which can be easily anticipated by those who skilled in the art is obviously contained in the scope of the present invention. Also, in order to make the clear description, a width, a thickness, a shape, and others of each portion in the drawings are schematically illustrated more than those in an actual aspect in some cases. However, the illustration is only one example, and does not limit the interpretation of the present invention.

In the present specification and each drawing, similar elements to those described earlier for the already-described drawings are denoted with the same reference characters, and detailed description for them is appropriately omitted in some cases.

First Embodiment

<Configuration of Semiconductor Device>

FIG. 1 is a block diagram showing a configuration of a semiconductor device according to a first embodiment. Although not particularly limited, a semiconductor device 1 shown in FIG. 1 is a semiconductor device for industrial network communication. While the semiconductor device 1 has a plurality of circuit blocks for the network communication, FIG. 1 shows only a portion required for explanation.

In FIG. 1, a numerical symbol "2" indicates a processor connected to a bus 12. To the bus 12, not only the processor 2 but also a plurality of peripheral blocks, memories and others are connected. In this drawing, as the peripheral block, a direct memory access controller (hereinafter, referred to as DMA controller) 3 is connected to the bus 12. And, a numerical symbol "4" indicates the memory connected to the bus 12. In the memory 4, a program of a real-time OS and a plurality of application programs operating on the real-time OS are stored.

The processor 2 reads out the program of the real-time OS through the bus 12, and executes the real-time OS. Each of the above-described plurality of application programs is separated into a plurality of tasks by the real-time OS, and the separated tasks are executed by the processor 2 while the tasks are switched. The DMA controller 3 is assigned to a specific task, and the DMA controller 3 operates when the specific task is executed.

In FIG. 1, a numerical symbol "5" indicates an oscillating circuit. Although not particularly limited, the oscillating circuit 5 is connected to a quartz oscillator 13 through external terminals 15-1 and 15-2 of the semiconductor device 1, and outputs a clock signal CLK1 having a predetermined frequency determined by the quartz oscillator 13. Although not particularly limited, the clock signal CLK1 is supplied to a multiplying circuit 6 that multiplies a frequency, and a multiplied clock signal CLK2 is output from the multiplying circuit 6. The frequency of the clock signal CLK1 is about 25 MHz although not particularly limited. The multiplying circuit 6 has, for example, so-called PLL (Phase Locked Loop), and generates a clock signal having, for example, about 500 MHz from the clock signal CLK1 having about 25 MHz by using the PLL, and outputs the signal as the clock signal CLK2.

The clock signal CLK2 is supplied to a timer 7 and a frequency dividing circuit 10. The timer 7 generates a time clock signal Tck on the basis of the clock signal CLK2. The timer 7 takes a count of, for example, the clock signal CLK2. When the timer takes a predetermined number count, it changes a voltage of the time clock signal Tck. In this manner, the time clock signal Tck becomes a clock signal taking predetermined time as one cycle. The time clock signal Tck is supplied to the processor 2. In the processor 2, the supplied time clock signal Tck is used as a reference clock signal for determining time in the real-time OS. Note that the time clock signal Tck is supplied to not only the processor 2 but also other circuit block inside the semiconductor device 1 such as a processor-use-rate measuring circuit described later.

The frequency dividing circuit 10 is a variable frequency dividing circuit. The frequency dividing circuit 10 divides a frequency of the clock signal CLK2 in accordance with a frequency dividing value (divide-by value) indicated by frequency-dividing-value information DINF supplied from the frequency-dividing-value selecting circuit 9, and supplies a clock signal obtained by the frequency division to the processor 2 as an operational clock signal O-CLK. The processor 2 operates in synchronization with this operational clock signal O-CLK.

In FIG. 1, a numerical symbol "8" indicates the processor-use-rate measuring circuit, and a numerical symbol "11" indicates a target-use-rate register. The processor-use-rate measuring circuit 8 has clock counters X1 and X2, measures execution time during which the idle task is executed, by using the clock counters X1 and X2 or others in a hardware form, acquires a ratio between the execution time for the idle task that has been obtained by the measurement and predetermined processing time, and outputs the acquired ratio as use-rate information DUD of the processor. That is, in the processor-use-rate measuring circuit 8, the execution time for the idle task is assumed as unused time of the processor 2, so that a rate between the predetermined time (such as entire processing time by the processor 2) and the unused time that has been assumed is acquired as the processor use rate. In other words, the processor use rate shows a rate of time during which the processor 2 executes a task other than the idle task in predetermined time. The processor-use-rate measuring circuit 8 will be described in detail later.

To the target-use-rate register 11, a target use rate of the processor 2 is set through an external terminal 14 of the semiconductor device 1. Of course, the target use rate may be set to not the external terminal 14 but the target-use-rate register 11 through the bus 12. Since the execution time for the idle task is assumed as the unused time of the processor 2, the target use rate indicates a rate of time during which the processor 2 executes a task other than the idle task in the predetermined time. The target use rate is set to, for example, the target-use-rate register 11 through the external terminal 14 by a user who uses the semiconductor device 1. The target-use-rate register 11 outputs the set target use rate as target-use-rate information TUD.

The frequency-dividing-value selecting circuit 9 selects such a frequency dividing value as causing a small difference between the target use rate expressed by the target-use-rate information TUD and a current use rate of the processor 2 expressed by the use-rate information DUD output from the processor-use-rate measuring circuit 8, and outputs the selected frequency dividing value as the frequency-dividing-value information DINF.

For example, it is assumed that 70% is set to the target-use-rate register 11 while the current use rate of the processor 2 expressed by the use-rate information DUD is 50%. In this case, the frequency-dividing-value selecting circuit 9 selects a larger frequency dividing value than a current frequency dividing value, and outputs the frequency dividing value as the frequency-dividing-value information DINF. A frequency division ratio becomes smaller than a current frequency division ratio (1/"frequency dividing value"), and therefore, a frequency of the operational clock signal O-CLK output from the frequency dividing circuit 10 becomes low. Therefore, the operation of the processor 2 becomes slow, so that time during which the idle task having the lowest priority is executed can be reduced. When the execution time for the idle task is short as described above, a use rate expressed by the use-rate information DUD output next from the processor-use-rate measuring circuit 8 increases to be higher than 50% so that difference from the target use rate of 70% becomes small.

On the other hand, when the target use rate is set to 70% while the current use rate of the processor 2 expressed by the use-rate information DUD is, for example, 80%, the frequency-dividing-value selecting circuit 9 selects a smaller frequency dividing value than the current frequency dividing value, and outputs the frequency dividing value as the frequency-dividing-value information DINF. As a result, the frequency of the operational clock signal O-CLK output from the frequency dividing circuit 10 becomes high, so that the operation of the processor 2 becomes fast. In this manner, the execution time during which the idle task having the lowest priority is executed can be lengthened. When the execution time for the idle task is long, a use rate expressed by the use-rate information DUD output next from the processor-use-rate measuring circuit 8 decreases to be lower than 80% so that the difference from the target use rate of 70% becomes small.

The above-described explanation has described the example of setting of the target use rate from outside of the semiconductor device 1 by the user. However, the present invention is not limited to the example. For example, the target-use-rate information TUD expressing the target use rate of 70% may be fixedly supplied to the frequency-dividing-value selecting circuit 9. In this case, such a frequency dividing value as always keeping the use rate of the processor 2 of about 70% is output as the frequency-dividing-value information DINF from the frequency-dividing-value selecting circuit 9.

<Operation of Semiconductor Device>

Figure 2A:
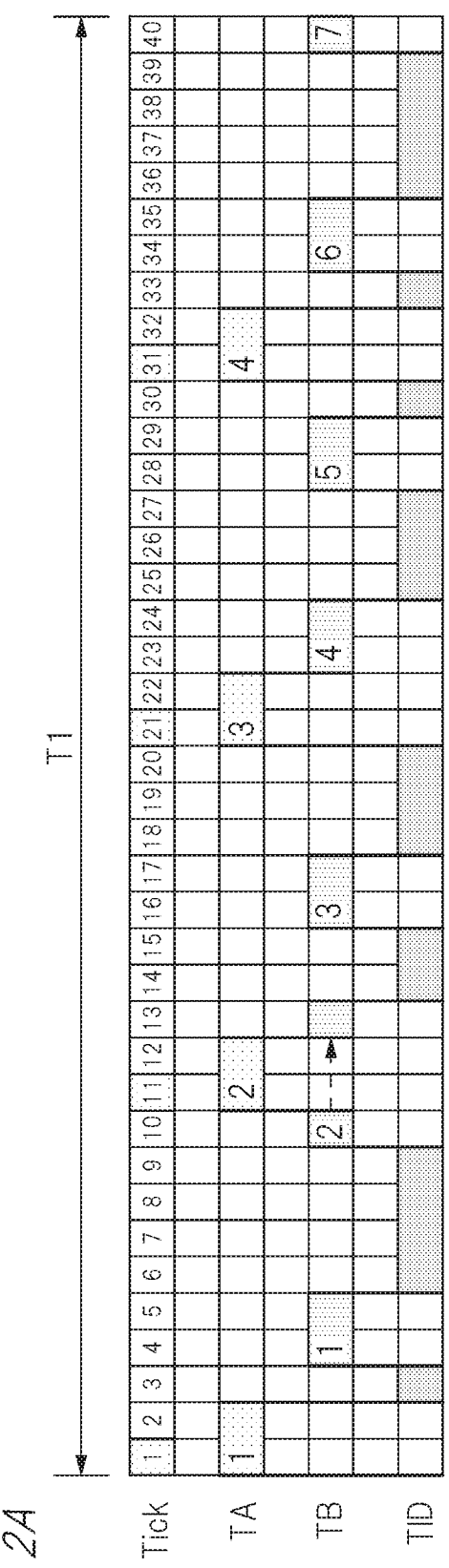
FIG. 2A is a timing chart showing an operation of the semiconductor device according to the first embodiment.
Figure 2B:
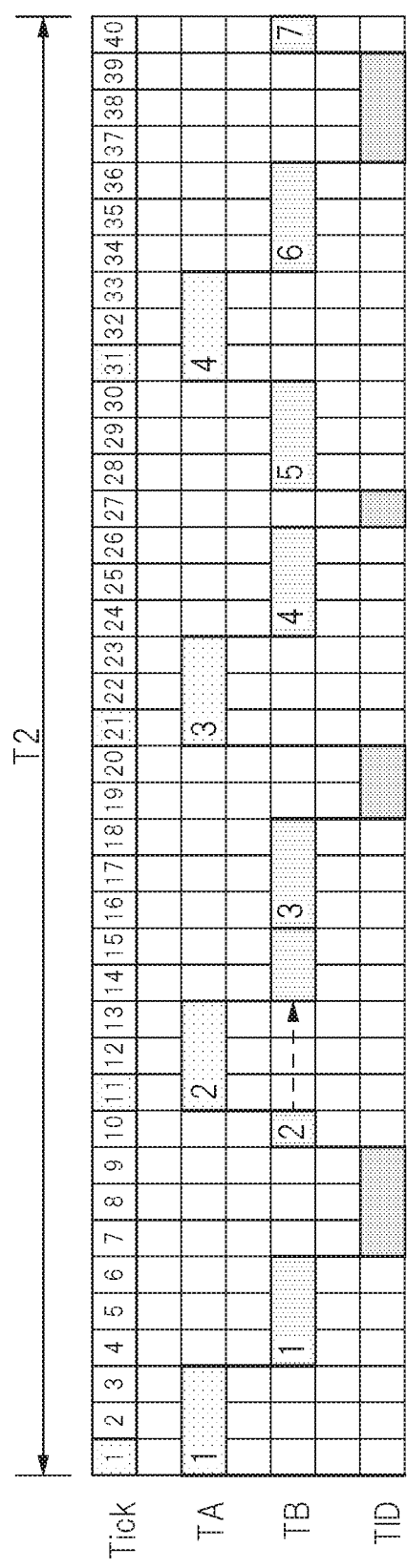
FIG. 2B is a timing chart showing an operation of the semiconductor device according to the first embodiment.

Next, an operation of the semiconductor device 1 according to the first embodiment will be explained. Each of FIGS. 2A and 2B is a timing chart showing the operation of the semiconductor device according to the first embodiment. Here, FIG. 2A shows timing of tasks TA, TB and TID executed by the processor 2 during the first term T1. FIG. 2B shows timing of tasks TA, TB and TID executed by the processor 2 during the second term T2 later than the term T1 in light of time. Note that the tasks TA and TB are the same task as each other in FIGS. 2A and 2B.

In FIGS. 2A and 2B, a symbol "Tick" indicates a moment expressed by the time clock signal Tck. That is, this is a moment in the real-time OS. While the frequency of the operational clock signal O-CLK supplied to the processor 2 is changed by the frequency-dividing-value information DINF, the frequency of the time clock signal Tck is constant. That is, even if the frequency of the operational clock signal O-CLK is changed, time interval expressed by the moment Tick does not change. Along elapse of time "t" during the terms T1 and T2, the moments Tick increase from 1 to 40 so as to have an equal interval therebetween.

The task TA has the highest priority such as a priority 1. The task TA is a real-time task that is cyclically executed while taking the "moment Tick=10" as one cycle. The task TB has a lower priority than that of the task TA, and is a task having, for example, a priority 2. The task TB is not a task that is cyclically executed but a random task that is executed by, for example, an interrupt request or others. Since the task TB is not cyclically executed, the task TB can be regarded as a non real-time task. The task TID has the lowest priority such as a priority 15. The task TID is a null task such an idle task executing a loop processing.

When the processor 2 does not execute the tasks TA and TB, it executes the task TID. In FIG. 2A, the task TA is executed at the moments Tick=1 to 2, 11 to 12, 21 to 22 and 31 to 32. The task TB is executed at the moments Tick=4 to 5, 10, 13, 16 to 17, 23 to 24, 28 to 29, 34 to 35 and 40. The task TID is executed at the moments Tick=3, 6 to 9, 14 to 15, 18 to 20, 25 to 27, 30, 33 and 36 to 39 in which the tasks TA and TB are not executed.

Explanation described here will be made in a case in which the use rate is acquired by the processor-use-rate measuring circuit 8 during the term T1, in which the frequency dividing value supplied to the frequency dividing circuit 10 is changed at the start of the term T2, and in which the frequency of the operational clock signal O-CLK is changed during the term T2.

Each of the terms T1 and T2 corresponds to the above-described predetermined time, that is, time required when the use rate of the processor 2 is acquired (entire processing time of the processor 2). In FIG. 2, the entire processing time of the processor 2 is 40 moments expressed as "Tick=1 to 40". The execution time during which the task TID that is the idle task is executed is totally 19 moments Tick=3, 6 to 9, 14 to 15, 18 to 20, 25 to 27, 30, 33 and 36 to 39. Therefore, the processor-use-rate measuring circuit 8 assumes 19 as the unused time of the processor 2, and outputs the use rate of "1-19/40=52.5%" as the use-rate information DUD.

The use rate of the processor 2 is 52.5% that still has a margin for processing a load, and therefore, the target use rate of, for example, 70 to 80% is set to the target-use-rate register 11 by the user. In response to this, the frequency-dividing-value selecting circuit 9 selects a larger frequency dividing value than a current frequency dividing value so that the difference between the target use rate and the use rate of the processor is small, and supplies the selected frequency dividing value as the frequency-dividing-value information DINF to the frequency dividing circuit 10. In response to this, the frequency dividing ratio in the frequency dividing circuit 10 is changed from a current frequency dividing ratio (for example, 1/3) to a smaller frequency dividing ratio (2/9).

In response to this, at the start of the term T2, the frequency of the operational clock signal O-CLK supplied to the processor 2 becomes low. Also during the term T2, the tasks TA and TB are executed as similar to the term T1. However, since the frequency of the operational clock signal O-CLK becomes low, the operation of the processor 2 becomes slow. Therefore, the time required to execute the tasks TA and TB becomes long. That is, as shown in FIG. 2B, the processor 2 executes the task TA at the moments Tick=1 to 3, 11 to 13, 21 to 23 and 31 to 33, and executes the task TB at the moments Tick=4 to 6, 10, 14 to 18, 24 to 26, 28 to 30, 34 to 36 and 40.

Therefore, the time during which the tasks TA and TB are not executed is at the moments Tick=7 to 9, 19 to 20, 27 and 37 to 39, and the processor 2 executes the task TID at this time. The execution time during which the task TID that is the idle task is executed is at 9 moments (that is a total of the moments Tick=7 to 9, 19 to 20, 27 and 37 to 39), and therefore, the unused time of the processor 2 can be reduced down to 9 moments. As a result, the use rate of the processor 2 can be improved up to "1-9/40=77.5%". That is, while the processing time for the tasks TA and TB becomes long, the execution time for the idle task can be short, and therefore, the use rate of the processor 2 can be improved. Even if the frequency of the operational clock signal O-CLK is low, the task TA that is the real-time task is activated with the same cycle (Tick=1 to 10) as shown in FIG. 2B as similar to FIG. 2A, and therefore, the real-time performance can be secured.

By the short execution time for the idle task as described above, the power consumption caused by the execution of the idle task can be reduced. And, an average power consumption caused when the tasks TA and TB are executed can be also reduced.

Note that an example has been made, the example describing that the task priorities include 15 priorities so that the task priority becomes lower as a priority number becomes larger. However, the present invention is not limited to this example. That is, the number of the task priorities may not be limited to 15, and that the task priority may become higher as the priority number becomes larger.

In FIGS. 2A and 2B, note that second execution of the task TB overlaps the task TA having the higher priority, and therefore, the task TB is switched to the task TA. Then, when the second execution of the task TA ends, the second execution of the task TB is reactivated.

<Processer-Use-Rate Measuring Circuit and Frequency-Dividing-Value Selecting Circuit>

The processer-use-rate measuring circuit 8 has clock counters X1 and X2 as shown in FIG. 1. The clock counters X1 and X2 are controlled by the processor 2. That is, each of the clock counters X1 and X2 takes a count of the time clock signal Tck in response to an instruction for the count start output from the processor 2. And, in response to an instruction for reading output from the processor 2, count values XC1 and XC2 counted by the clock counters X1 and X2 are read by the processor 2. Further, the count values of the clock counters X1 and X2 are cleared by a clear instruction output from the processor 2.

Figure 3:
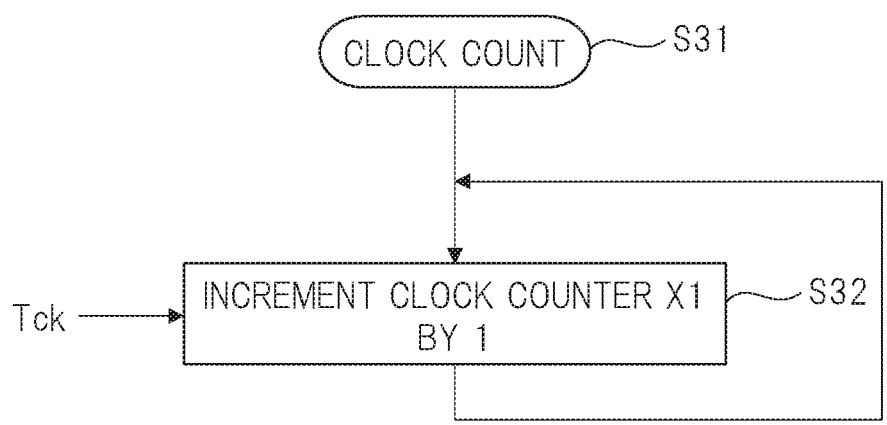
FIG. 3 is a flowchart showing operations of a processor-use-rate measuring circuit and a frequency-dividing-value selecting circuit according to the first embodiment.
Figure 4:
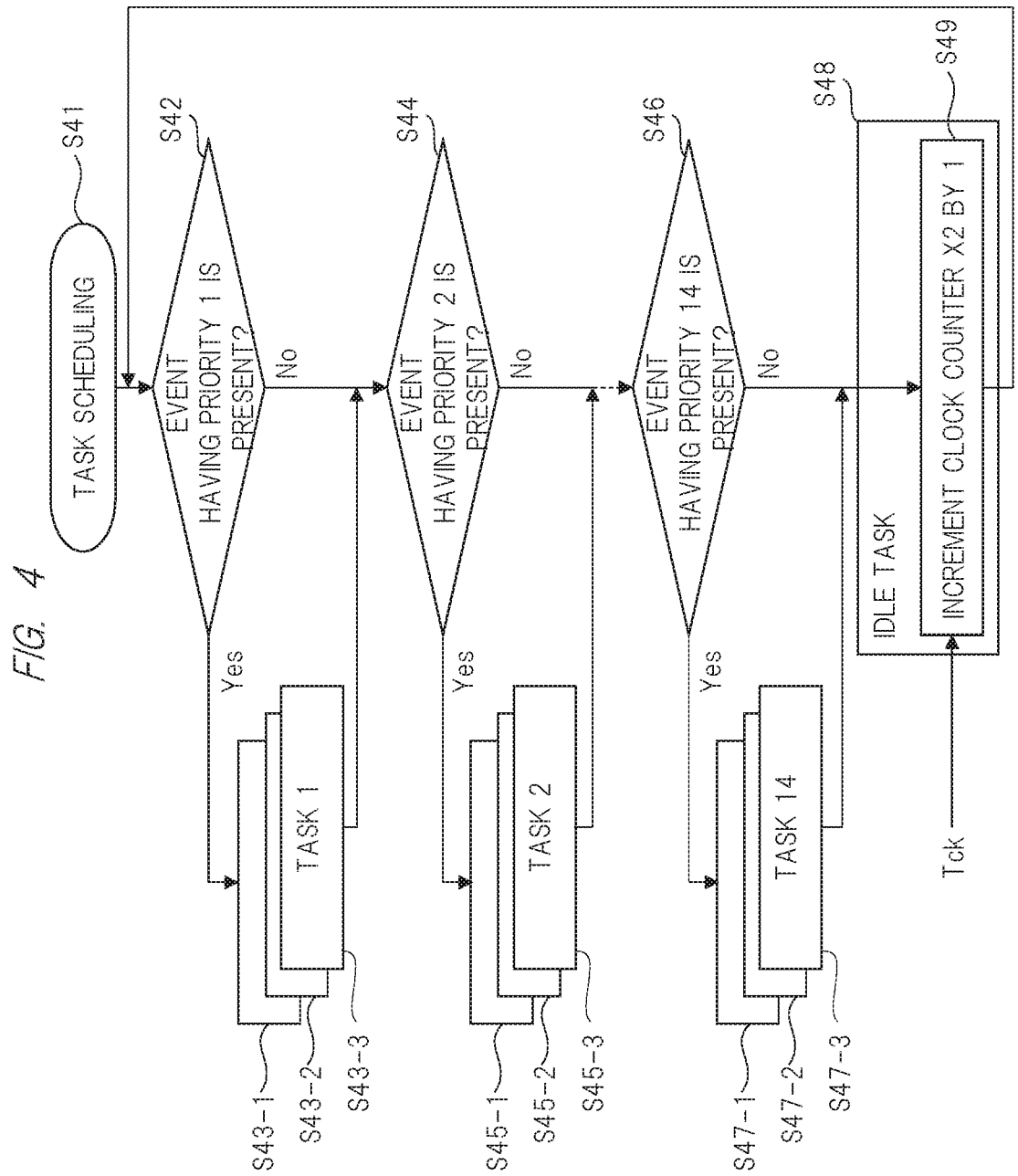
FIG. 4 is a flowchart showing operations of a processor-use-rate measuring circuit and a frequency-dividing-value selecting circuit according to the first embodiment.
Figure 5:
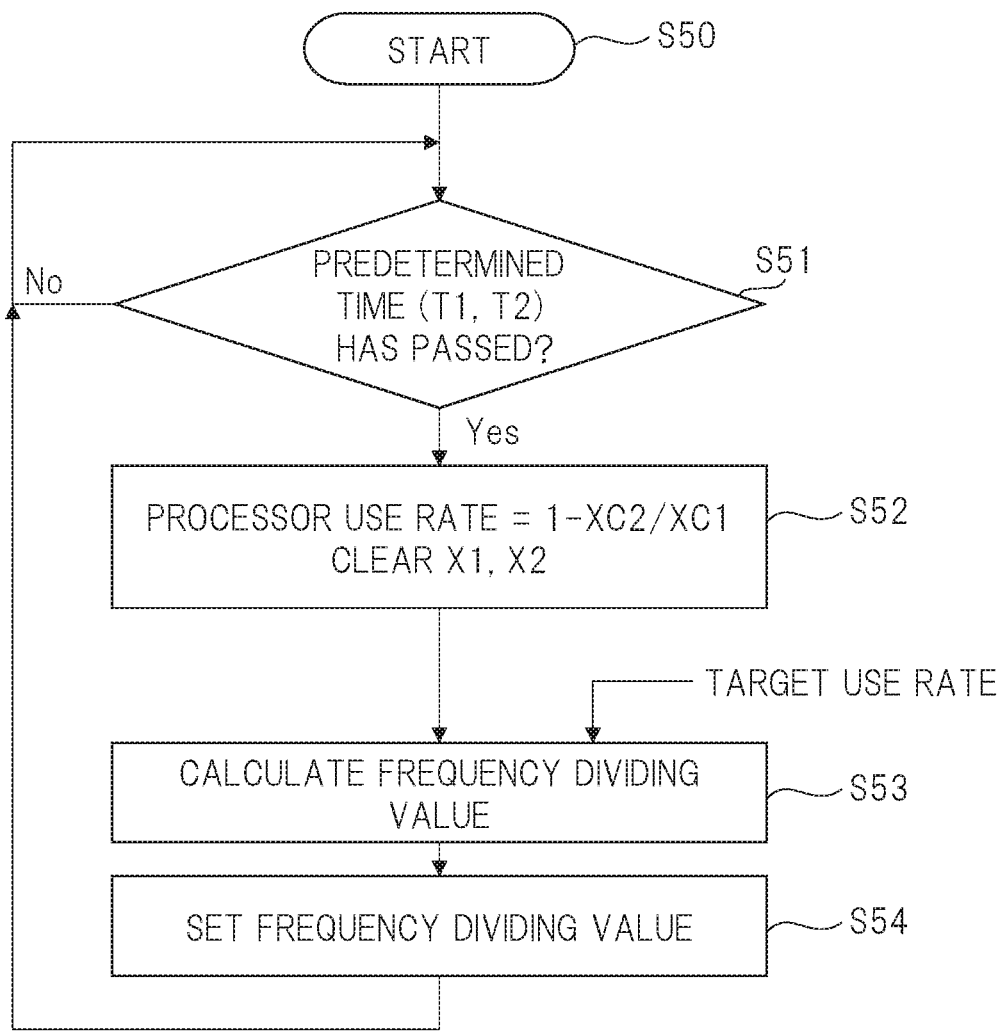
FIG. 5 is a flowchart showing operations of a processor-use-rate measuring circuit and a frequency-dividing-value selecting circuit according to the first embodiment.

Each of FIGS. 3 to 5 is a flowchart showing operations of the processer-use-rate measuring circuit and the frequency-dividing-value selecting circuit according to the first embodiment.

The processor 2 shown in FIG. 1 executes the processing shown in FIGS. 3 to 5 by executing a use-rate setting program for achieving functions of the processer-use-rate measuring circuit 8 and the frequency-dividing-value selecting circuit 9. In a course of the execution of the use-rate setting program, the processor 2 uses the clock counters X1 and X2 shown in FIG. 1. Although not particularly limited, this use-rate setting program is added to the program of the real-time OS.

The processor 2 starts the processing of the real-time OS at a step S50 in FIG. 5. Next, at a step S51 in FIG. 5, the processor 2 determines whether or not predetermined time has passed. This predetermined time that is determined at the step S51 corresponds to the first term T1 or the second term T2 explained with reference to FIG. 2. This step S51 is repeated until the predetermined time has passed. During the predetermined time in which the step S51 is repeated, the processor 2 executes the steps shown in FIGS. 3 and 4.

That is, at the start of the predetermined time, the processor 2 executes a step S31 in FIG. 3. At this step S31, the processor 2 instructs the clock counter X1 to start the counting. In response to this instruction, the clock counter X1 executes a step S32 every time the voltage of the time clock signal Tck changes. That is, at the step S32, the count value of the clock counter X1 is incremented by +1. In this manner, after the start of the predetermined time, the count value XC1 of the clock counter X1 is incremented by +1 every time the time clock signal Tck changes, and subsequently increases. The count value XC1 of the clock counter X1 represents the entire processing time of the processor 2 during the predetermined time.

And, at the time of the start of the predetermined time, the processor 2 executes a step S41 in FIG. 4. At the step S41, the processor 2 starts a task scheduling using the real-time OS. In FIG. 4, only a processing on the basis of the task priority in the task scheduling is shown. That is, at the step S42, it is determined whether or not an event corresponding to the task having the priority 1 is present. This drawing shows a case in which executions for a plurality of tasks S43-1 to S43-3 having the priority 1 are waited to be executed. In this case, the tasks S43-1 to S43-3 having the priority 1 are executed. When the executions for the tasks having the priority 1 are completed or when the event corresponding to the priority 1 is not present, a step S44 is executed next.

At the step S44, it is determined whether or not an event corresponding to a task having a priority 2 is present. This drawing shows a case in which executions for a plurality of tasks S45-1 to S45-3 having the priority 2 are waited to be executed. In this case, the tasks S45-1 to S45-3 having the priority 2 are executed. When the executions for the tasks having the priority 2 are completed or when the event corresponding to the priority 2 is not present, it is determined whether or not an event corresponding to a task having a priority 3 is present. If the event is present, the task having the priority 3 is executed.

Subsequently, it is similarly determined whether or not events corresponding to priorities 4 to 13 are present. If such an event is present, a task having a corresponding priority is executed. At a step S46, it is determined whether or not an event corresponding to a task having the priority 14 that is the second lowest priority is present. This drawing shows a case in which executions for a plurality of tasks S47-1 to S47-3 having the priority 14 are waited to be executed. In this case, the tasks S47-1 to S47-3 having the priority 14 are executed. When the executions for the tasks having the priority 14 are completed or when the event corresponding to the priority 14 is not present, a step S48 is executed next.

At the step S48, the idle task that is a task having the priority 15 that is the lowest priority is executed. At the step S48 for the idle task, the processor 2 executes the loop processing, and instructs the clock counter X2 to start the counting. In response to this, at a step S49, in the clock counter X2, the count value XC2 is incremented by +1 when the voltage of the time clock signal Tck changes.

When the idle task is executed at the step S48, the sequence returns to the step S42 next, and then, the above-described operations are repeated during the above-described predetermined time.

In this manner, if the event is present during the predetermined time, the task corresponding to the event is executed. And, for example, if the events corresponding to the priorities 1 to 14 are not present, the idle task is executed. In the idle task, the count value XC2 of the clock counter X2 is updated in response to the voltage change of the time clock signal Tck. Therefore, the count value XC2 of the clock counter X2 is a total number of the changes of the time clock signal Tck in the idle task executed during the predetermined time. In the description with the example of FIG. 2, the count value XC2 of the clock counter X2 represents the execution moments 19 and 9 at which the idle task is executed during the terms (the predetermined time) T1 and T2.

The explanation will return to FIG. 5 again. When it is determined at a step S51 that the predetermined time has passed, a step S52 is executed next. At the step S52, the processor 2 reads out the count values XC1 and XC2 from the clock counters X1 and X2, and acquires the use rate of the processor on the basis of the read count values XC1 and XC2. That is, the processor 2 calculates "1−XC2/XC1".

At the step S52, the count values of the clock counters X1 and X2 are cleared for a processing during the next predetermined time.

Next, at a step S53, the processor 2 executes calculation of the frequency dividing value for acquiring the frequency of the operational clock signal O-CLK by using the target use rate notified on the basis of the target-use-rate information TUD and the use rate of the processor calculated at the step S52. The processor 2 outputs the frequency dividing value calculated by the frequency-dividing-value calculation to the frequency dividing circuit 10 as a selected frequency dividing value.

An example of the frequency-dividing-value calculation executed at the step S53 is as follows. That is, the processor 2 determines which one of the target use rate and the use rate of the processor is higher than the other, so that a difference between the target use rate and the use rate of the processor is acquired. When the target use rate is higher than the use rate of the processor, the processor 2 selects a larger frequency dividing value than a current frequency dividing value, and calculates a difference between the current frequency dividing value and the selected frequency dividing value by using the difference between the target use rate and the use rate of the processor. On the other hand, when the target use rate is lower than the use rate of the processor, the processor 2 selects a smaller frequency dividing value than the current frequency dividing value, and calculates the difference between the current frequency dividing value and the selected frequency dividing value by using the difference between the target use rate and the use rate of the processor. Of course, the frequency-dividing-value calculation executed at the step S53 is not limited this example.

After the step S53, the processor 2 executes a step S54. At the step S54, the frequency dividing value selected at the step S53 is set to the frequency dividing circuit 10. Then, the sequence returns to the step S51, and the above-described steps S51 to S54 are executed.

When the step S51 is repeatedly executed, the operational clock signal O-CLK depending on the frequency dividing value set at the step S54 that has been executed earlier is supplied to the processor 2. That is, as explained with reference to FIG. 2, the frequency of the operational clock signal O-CLK supplied to the processor 2 during the second term T2 is changed on the basis of the use rate of the processor 2 measured during the first term T1. As a result, by the use rate of the processor 2 during the first term T1 and the target use rate, for example, the execution time for the idle task executed during the second term T2 can be shortened, so that the use rate of the processor 2 can be improved.

In the semiconductor device 1 according to the first embodiment, the processor is not operated by the operational clock signal having the frequency that is fixedly determined for each task, but the frequency of the operational clock signal during the next predetermined time (the term T2) is changed on the basis of the use rate that is acquired by the measuring of the use rate of the processor during the predetermined time (the term T1). In this manner, the frequency of the operational clock signal for operating the processor can be optimized in accordance with an operational status of the processor. As a result of this, power consumptions of the processor and the semiconductor device in which the processor is embedded can be efficiently suppressed.

In the first embodiment, the frequency of the operational clock signal is not changed every time the task is switched, but the frequency of the operational clock signal is changed every predetermined time. That is, during the term in which the use rate of the processor is measured, the frequency of the operational clock signal is not changed. Therefore, frequent change of the frequency of the operational clock signal can be prevented, and the operations of the processor and the semiconductor device can be prevented from being unstable.

In the semiconductor device according to the first embodiment, the processor 2 executes the real-time OS to execute the tasks while switching the real-time task, the non real-time task and the idle task. In the semiconductor device according to the first embodiment, it can be regarded that feedback is made so that the operational clock signal of the processor is dynamically changed by using the use rate of the processor 2 that is acquired from the information related to the idle task when the real-time OS is executed.

It can be regarded that the processor-use-rate measuring circuit 8 shown in FIG. 1 is a use-rate measuring unit. And, it can be regarded that a frequency changing unit is configured of the frequency-dividing-value selecting circuit 9 and the frequency dividing circuit 10.

And, it can be regarded that each of FIGS. 3 to 5 shows a control method for controlling the processor 2. In this case, it can be regarded that a use-rate measuring step for measuring the use rate of the processor includes a step S32 shown in FIG. 3, a step S48 shown in FIG. 4 and a step S52 shown in FIG. 5, and it can be regarded that a frequency changing step for changing the frequency of the operational clock signal includes steps S53 and S54 shown in FIG. 5.

Second Embodiment

In a second embodiment, a semiconductor device capable of suppressing rapid change of the frequency of the operational clock signal is provided. In the first embodiment, the frequency dividing value is selected on the basis of the use rate of the processor measured during the first term T1 (in FIG. 2), and the frequency of the operational clock signal O-CLK supplied to the processor 2 during the second term T2 (in FIG. 2) is determined by the selected frequency dividing value. Therefore, in shift from the first term T1 to the second term T2, it is concerned that the frequency of the operational clock signal O-CLK largely changes. It is thought that a large change amount of the frequency of the operational clock signal O-CLK makes the operation of the processor 2 unstable. The second embodiment provides stepwise change in the frequency dividing value of which the frequency-dividing-value selecting circuit 9 (in FIG. 1) notifies the frequency dividing circuit 10. This manner can prevent the large change in the frequency of the operational clock signal O-CLK, so that the stable operation of the processor 2 can be secured.

Figure 6:
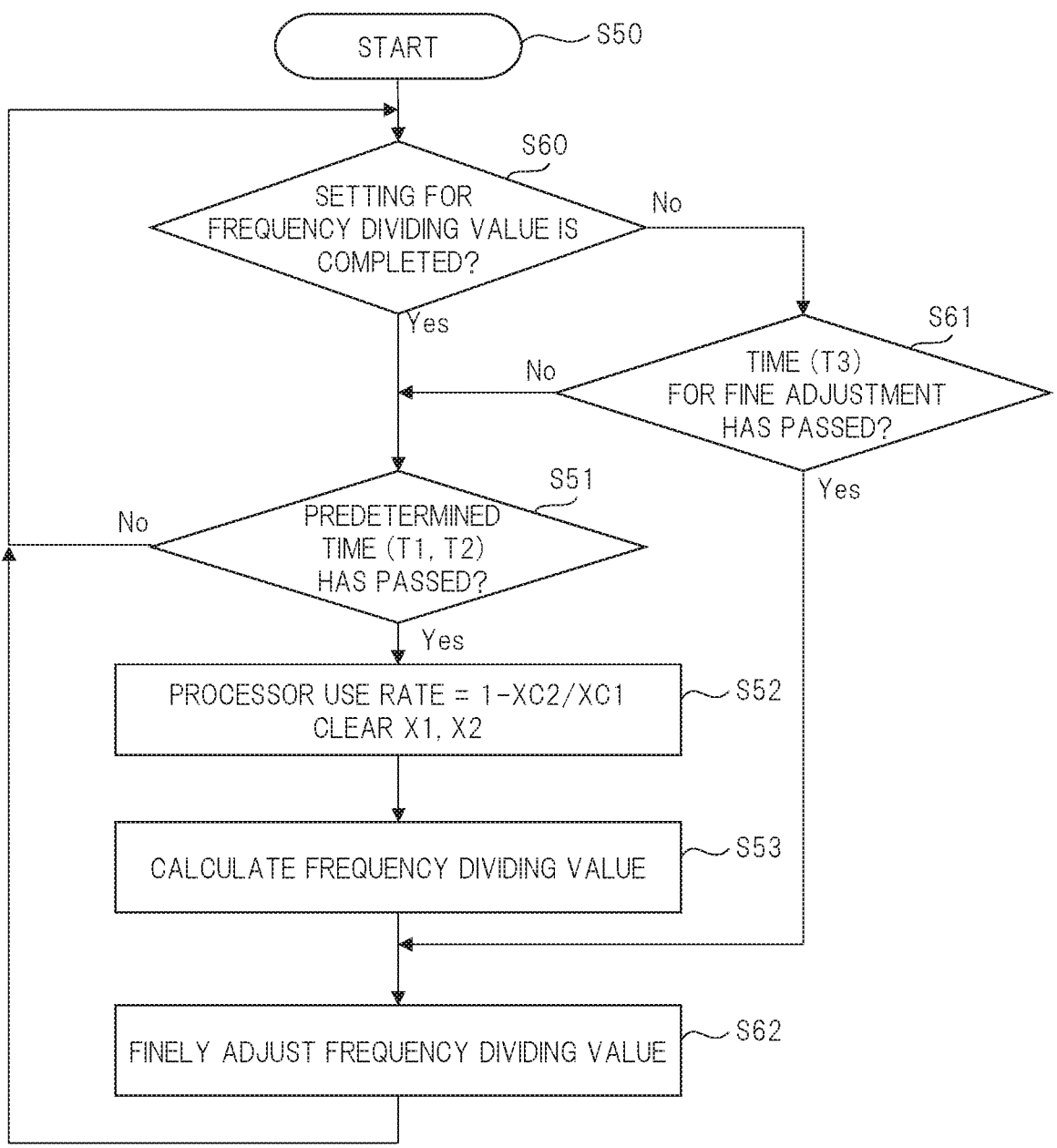
FIG. 6 is a flowchart showing operations of a processor-use-rate measuring circuit and a frequency-dividing-value selecting circuit according to a second embodiment.
Figure 7:
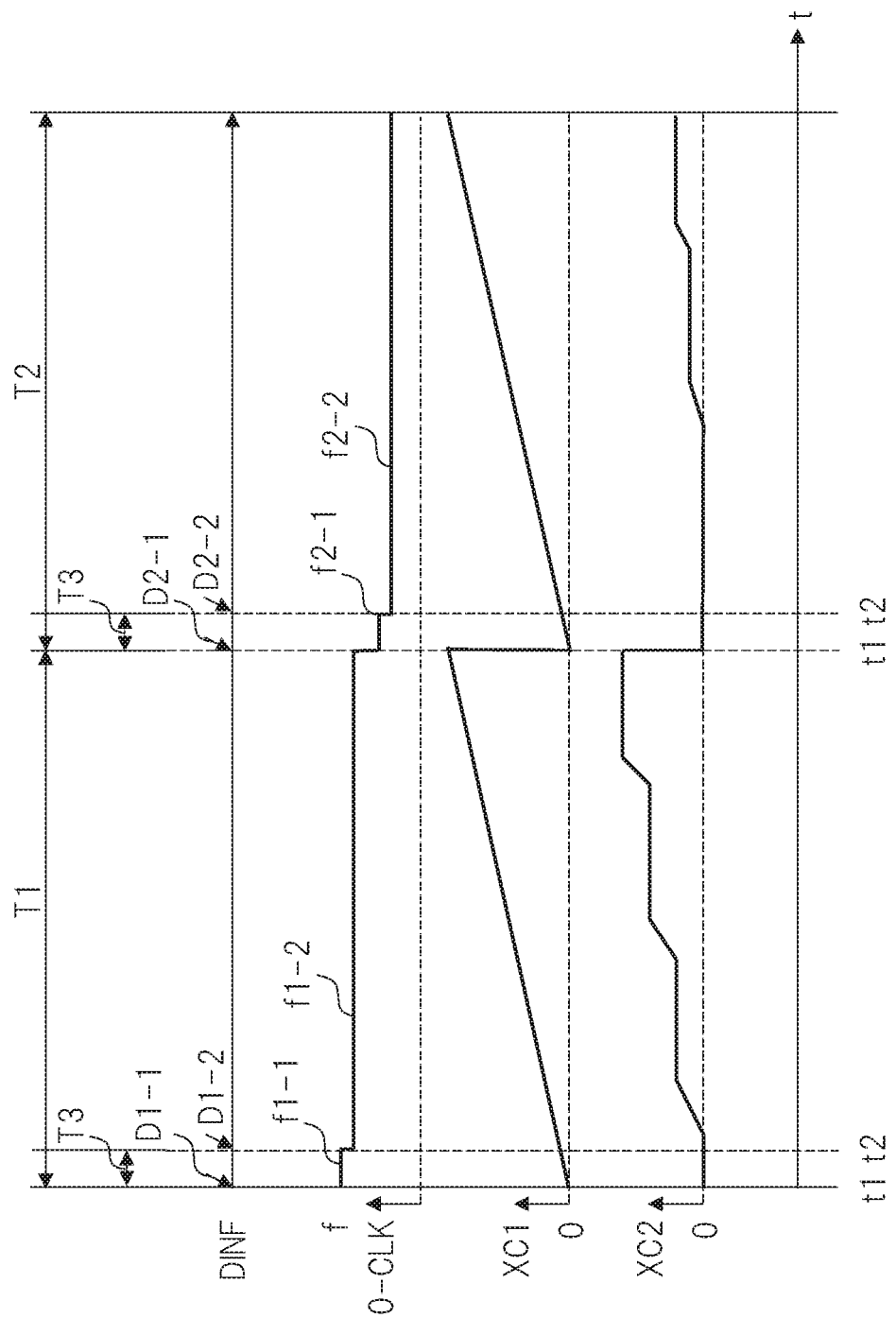
FIG. 7 is a timing chart for explaining an operation of the semiconductor device according to the second embodiment.

FIG. 6 is a flowchart showing operations of a processor-use-rate measuring circuit and a frequency-dividing-value selecting circuit according to the second embodiment. FIG. 7 is a timing chart for explaining an operation of the semiconductor device according to the second embodiment. A configuration of the semiconductor device 1 according to the second embodiment is the same as that of the semiconductor device explained in the first embodiment, and therefore, explanation thereof is omitted.

FIG. 6 is similar to FIG. 5, and therefore, different points will be mainly explained. In FIG. 6, steps S60 to S62 are added to FIG. 5. Note that the step S54 for setting the frequency dividing value explained with reference to FIG. 5 is included in the step S62.

As similar to the explanation with reference to FIG. 5, at a step S53 in FIG. 6, the frequency dividing value is calculated on the basis of the use rate of the processor measured during the term T1. The calculated frequency dividing value is finely adjusted at a step S62, and the finely-adjusted frequency dividing value is set as the frequency-dividing-value information DINF to the frequency dividing circuit 10. It is assumed that the frequency dividing value calculated at the step S53 is, for example, 4. In this case, the frequency dividing circuit 10 divides the frequency of the clock signal CLK2 by four. At the step S62, for the fine adjustment, the processor 2 divides the divide-by-four frequency into, for example, a divide-by-two frequency and a divide-by-two frequency. The frequency-dividing-value selecting circuit 9 supplies the divide-by-two frequency acquired by the division to the frequency dividing circuit 10 as the frequency-dividing-value information DINF. In the description with reference to FIG. 7, at a start moment "t1" of the second term T2, the frequency-dividing-value selecting circuit 9 supplies a frequency dividing value D2-1 indicating the divide-by-two frequency to the frequency dividing circuit 10 as the frequency-dividing-value information DINF. In response to this, the frequency dividing circuit 10 supplies a clock signal having a frequency f2-1, that is obtained by dividing the frequency of the clock signal CLK2 by two, to the processor 2 as the operational clock signal O-CLK. As a result, the processor 2 starts the processing during the second term by using the operational clock signal O-CLK having the frequency f2-1.

Next, the processor 2 executes a step S60. At the step S60, it is determined whether or not the setting for the frequency dividing value is completed. Because of getting information indicating that all frequency dividing values acquired by the division at the step S62 have not been supplied to the frequency dividing circuit 10 as the frequency-dividing-value information DINF, the processor 2 determines at the step S60 that the setting for the frequency dividing values has not been completed. In this manner, a step S61 is executed next. At the step S61, it is determined whether or not a term (T3) for the fine adjustment has passed. If it is determined at the step S61 that the term (T3) has not passed, the step S51 is executed.

On the other hand, if it is determined at the step S61 that the term (T3) for the fine adjustment has passed, the step S62 is executed next again. At the step S62, the processor 2 acquires a divide-by-four frequency by multiplying a left divide-by-two frequency acquired by the division with the divide-by-two frequency that has been output earlier as the frequency-dividing-value information DINF, and notifies the frequency dividing circuit 10 of the divide-by-four frequency as a frequency dividing value D2-2 at a moment "t2" at which the term (T3) for the fine adjustment passed as shown in FIG. 7.

In response to this, at the moment t1, the frequency of the operational clock signal O-CLK changes to "f2-1" that is the divide-by-two frequency, and is maintained at this frequency f2-1 during the term (T3) for the fine adjustment. Then, at the moment t2, the frequency of the operational clock signal O-CLK changes to "f2-2" that is the divide-by-four frequency. That is, stepwise changes in the frequency dividing value and the operational clock signal O-CLK occur along with the elapse of time. Therefore, the large change in the operational clock signal O-CLK in a short time can be prevented, and the operations of the processor 2 and the semiconductor device 1 can be stabilized.

The embodiment has described the example of the execution of the multiplication by the processor 2 at the step S62 for the notification of the frequency dividing value D2-2 to the frequency dividing circuit 10. However, the present invention is not limited to this. That is, the frequency dividing circuit 10 may be notified of the frequency dividing value calculated during the first term T1 as the frequency dividing value D2-2. Alternatively, at the step S62, the processor 2 may notify the frequency dividing circuit 10 of the left divide-by-two frequency acquired by the division, and acquire the divide-by-four frequency from the calculation by the multiplication in the frequency dividing circuit 10. Further, the frequency dividing value for the division may be not limited to 2, and the frequency may be divided by three or more.

Also in the second embodiment, as similar to the first embodiment, the count value XC1 of the clock counter X1 is incremented during the first and second terms T1 and T2 in accordance with the processing of the processor 2 as shown in FIG. 7. As similar to the first embodiment, the count value XC2 of the clock counter X2 is incremented in a term when the idle task is executed during the first and second terms T1 and T2.

In FIG. 7, each of the symbols D1-1 and D1-2 represents the frequency dividing value obtained by the division of the frequency by the frequency dividing value calculated in the earlier term than the first term T1, the symbol "f1-1" represents the frequency obtained by the frequency divided by the frequency dividing value D1-1, and the symbol "f1-2" represents the frequency obtained by the frequency divided by the frequency dividing value D1-2.

In the embodiments, the case of the execution of the program of the real-time OS by the processor 2 has been explained. However, the present invention is not limited to this case. That is, the real-time OS may be implemented by hardware as described in the Patent Document 2. An application case to a task processing device described in the Patent Document 2 will be exemplified as follows. That is, the above-described clock counters X1 and X2 are added to the task processing device. When a status storing unit corresponding to the idle task is selected from a plurality of status storing units included in the task processing device, the steps explained with reference to FIGS. 3 to 5 may be executed. In this manner, even when the real-time OS is implemented by the hardware, the use rate of the processor can be measured by using the clock counters X1 and X2. On the basis of the measured use rate of the processor, the frequency of the operational clock signal for operating the processor during a next period can be changed.

The above-described first embodiment has showed the example in which the clock counters X1 and X2 take a count of the time clock signal Tck. However, the present invention is not limited to this. The clock counters X1 and X2 only have to take a count of the same clock signal. Therefore, the clock counters X1 and X2 may take a count of, for example, voltage change in the operational clock signal O-CLK the frequency of which changes for each term.

In the foregoing, the invention made by the present inventor has been concretely described on the basis of the embodiments. However, it is needless to say that the present invention is not limited to the foregoing embodiments and various modifications can be made within the scope of the present invention.

What is claimed is:

1. A semiconductor device comprising:
   a processor;
   a use rate measuring circuit configured to measure a use rate of the processor during a first term; and
   a frequency changing circuit configured to change a frequency of an operational clock signal supplied to the processor during a second term later than the first term on a basis of the use rate measured by the use rate measuring circuit,
   wherein the processor executes a plurality of tasks while switching the plurality of tasks in synchronization with the operational clock signal supplied,
   wherein the processor executes the plurality of tasks including an idle task during the first term and the second term,
   wherein the use rate measuring circuit measures the use rate of the processor on a basis of the idle task executed during the first term,
   wherein the use rate measuring circuit measures the use rate of the processor on a basis of execution time for the idle task executed during the first term,
   wherein the frequency changing circuit changes the frequency of the operational clock signal so that a difference between the use rate measured by the use rate measuring circuit and a target use rate is smaller than a difference between the use rate measured by the use rate measuring circuit and a target use rate before changing the frequency of the operational clock signal,
   wherein the frequency changing circuit includes:
   a frequency dividing circuit configured to divide a frequency of a clock signal; and
   a frequency-dividing-value selecting circuit connected to the frequency dividing circuit and configured to supply, to the frequency dividing circuit, such a frequency dividing value as causing the difference between the use rate measured by the use rate measuring circuit and the target use rate to be smaller than the difference between the use rate measured by the use rate measuring circuit and a target use rate before changing the frequency of the operational clock signal, on the basis of the use rate measured by the use rate measuring circuit and the target use rate, and
   wherein the frequency dividing circuit divides the frequency of the clock signal in accordance with the frequency dividing value supplied from the frequency-dividing-value selecting circuit, and outputs the operational clock signal.

2. The semiconductor device according to claim 1, wherein the frequency-dividing-value selecting circuit makes the frequency dividing value change stepwise when the frequency dividing value is changed.

3. The semiconductor device according to claim 1, further comprising:
   a register to which the target use rate is set.

4. A processor control method, comprising:
   measuring a use rate of a processor during a first term;
   changing a frequency of an operational clock signal; and
   supplying the operational clock to the processor during a second term later than the first term on a basis of the use rate measured at the measuring;
   executing, by the processor, a plurality of tasks while switching the plurality of tasks in synchronization with the operational clock signal,
   wherein the executing includes:
   executing a real-time task cyclically;
   executing a non-real-time task at random; and
   executing an idle task while the executing of the real-time task and the executing of the non-real-time task are not performed,
   wherein the measuring includes calculating the use rate based on a time of the first term and an execution time when the executing of the idle task is performed during the first term,
   wherein the changing includes:
   dividing a frequency of a clock signal to generate the operational clock signal; and
   selecting a frequency dividing value that is used at the dividing so that a difference between the use rate calculated at the calculating and a target use rate is smaller than a difference between the use rate measured by the use rate measuring circuit and a target use rate before changing the frequency of the operational clock signal.

* * * * *